(12) United States Patent
Jeong et al.

(10) Patent No.: US 11,220,454 B2
(45) Date of Patent: Jan. 11, 2022

(54) METHOD FOR MANUFACTURING WINDOW GLASS AND CARRIER FILM USED FOR THE SAME

(71) Applicant: Samsung Display Co., Ltd., Yongin-Si (KR)

(72) Inventors: Jaehoon Jeong, Bucheon-si (KR); Gyeongmin Kim, Hwaseong-si (KR); Taehwan Kim, Hwaseong-si (KR); Sanggu Kim, Seoul (KR); Sungguk An, Suwon-si (KR); Hungkun Ahn, Seongnam-si (KR)

(73) Assignee: Samsung Display Co., Ltd.

( * ) Notice: Subject to any disclaimer, the term of this patent is extended or adjusted under 35 U.S.C. 154(b) by 34 days.

(21) Appl. No.: 16/255,669

(22) Filed: Jan. 23, 2019

(65) Prior Publication Data
US 2019/0300424 A1 Oct. 3, 2019

(30) Foreign Application Priority Data

Mar. 30, 2018 (KR) .......................... 10-2018-0037147

(51) Int. Cl.
*C03C 17/32* (2006.01)
*G02B 1/10* (2015.01)

(52) U.S. Cl.
CPC .............. *C03C 17/32* (2013.01); *G02B 1/10* (2013.01); *C03C 2218/11* (2013.01); *C03C 2218/32* (2013.01)

(58) Field of Classification Search
CPC . C03C 17/32; C03C 2218/32; C03C 2218/11; C03C 2217/74; C03C 17/3405; C03C 2218/118; G02B 1/10; G03F 7/027; G03F 7/004; C09J 7/241; C09J 7/255; C09J 7/25; C09J 2463/00; C09J 2467/006; C09J 2469/006; C09J 2423/106; C09J 2301/122; C09J 2301/312
See application file for complete search history.

(56) References Cited

U.S. PATENT DOCUMENTS

| 5,631,107 A * | 5/1997 | Tarumi ................. G03H 1/0252 156/230 |
| 2011/0073847 A1* | 3/2011 | Kobayashi .......... H01L 51/0097 257/40 |
| 2017/0179424 A1 | 6/2017 | Lee et al. |

FOREIGN PATENT DOCUMENTS

| CN | 104375386 A * | 2/2015 |
| KR | 10-1327901 B1 | 11/2013 |

(Continued)

*Primary Examiner* — Michael N Orlando
*Assistant Examiner* — Abhishek A Patwardhan
(74) *Attorney, Agent, or Firm* — Innovation Counsel LLP

(57) ABSTRACT

A method for manufacturing a window glass according to an embodiment of the present disclosure includes: preparing a carrier film; forming an assembly by attaching the carrier film to a window base; coating a UV resin on a jig; placing the assembly on the jig so that the window base faces downwards; attaching the assembly and the UV resin on the jig to each other by using a roller; primarily curing the UV resin by performing primary UV irradiation to an upper portion of the assembly attached with the UV resin on the jig; removing an uncured portion of the UV resin; and secondarily curing a remaining portion of the UV resin from which the uncured portion of the UV resin has been removed by performing secondary UV irradiation to the remaining portion of the UV resin.

16 Claims, 8 Drawing Sheets

(56) References Cited

FOREIGN PATENT DOCUMENTS

| KR | 10-2015-0042092 A | 4/2015 |
| KR | 10-2016-0012679 A | 2/2016 |
| KR | 10-2017-0073948 A | 6/2017 |

\* cited by examiner

FIG. 9
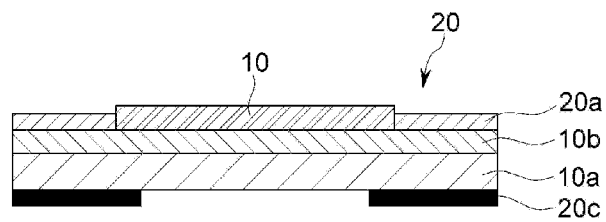
FIG. 10
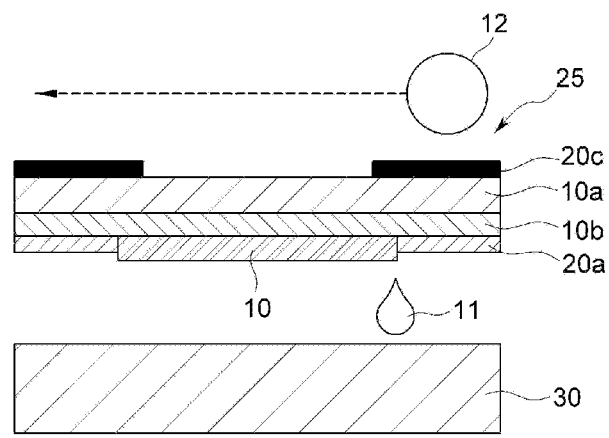
FIG. 11
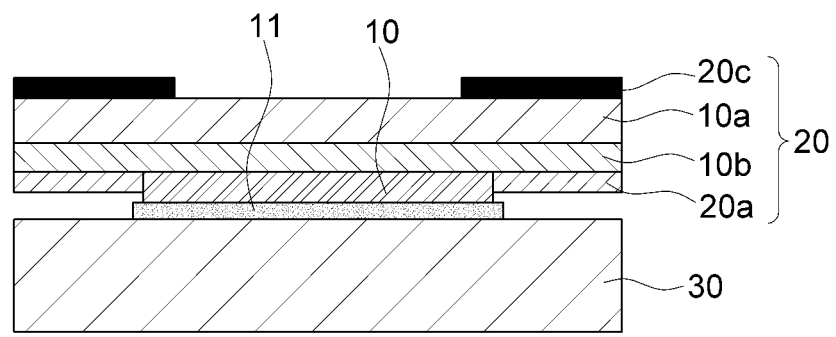

Perform primary irradition with UV rays

METHOD FOR MANUFACTURING WINDOW GLASS AND CARRIER FILM USED FOR THE SAME

CROSS-REFERENCE TO RELATED APPLICATION

This application claims priority to and benefit of Korean Patent Application No. 10-2018-0037147, filed on Mar. 30, 2018, in the Korean Intellectual Property Office (KIPO), the disclosure of which is incorporated by reference herein in its entirety.

TECHNICAL FIELD

One or more aspects of embodiments of the present disclosure are directed toward a method for manufacturing a window glass and to a carrier film used in the method for manufacturing a window glass, and more particularly, to a method for manufacturing a window glass for a large-sized display device and to a carrier film used in the method for manufacturing a window glass

DISCUSSION OF RELATED ART

Display devices may be classified into liquid crystal display ("LCD") devices, organic light emitting diode ("OLED") display devices, plasma display panel ("PDP") devices, electrophoretic display devices, or the like based on a light emitting scheme thereof.

A display device may employ a touch screen to provide convenience of operation. A window formed of tempered glass or a transparent polymer resin is disposed on the front surface of the touch screen. In such a case, the window glass serves to protect the display device from external impact or damage due to contact.

In recent years, the advent of flexible display devices and foldable display devices with the trend toward soft electronics has led to the development of window glasses for such flexible or foldable display devices The above information disclosed in this background section is only for enhancement of understanding of the background of the inventive concept, and, accordingly, it may contain information that does not form the prior art already known to a person of ordinary skill in the art.

SUMMARY

Embodiments of the present disclosure may be directed to a method for manufacturing a window glass that can simplify the process of manufacturing a window glass and reduce the manufacturing costs by forming a light blocking layer, which functions as a UV mold, at a carrier film itself to omit the UV molding process from the process of manufacturing a window glass, and to the carrier film used in the method for manufacturing a window glass.

In addition, embodiments of the present disclosure may be directed to a method for manufacturing a window glass that can maintain the original surface quality of the glass by attaching a glass substrate coated with a resin to a window base assembled with a carrier film by using a roller, and to the carrier film used in the method for manufacturing a window glass.

In addition, embodiments of the present disclosure may be directed to a method for manufacturing a window glass that can substantially prevent a phenomenon in which a UV resin that has been pre-cured during primary UV irradiation flows over the area of a window base by designing the area of a light blocking layer of a carrier film to be less than the area defined by a liner layer and by designing the area of the window base to be larger than the area defined by the light blocking layer, and to the carrier film used in the method for manufacturing a window glass.

According to an embodiment of the present disclosure, a method for manufacturing a window glass includes: preparing a carrier film; forming an assembly by attaching the carrier film to a window base; coating a UV resin on a jig; placing the assembly on the jig so that the window base faces downwards; attaching the assembly and the UV resin on the jig to each other by using a roller; primarily curing the UV resin by performing primary UV irradiation to an upper portion of the assembly attached with the UV resin on the jig; removing an uncured portion of the UV resin from a remaining portion of the UV resin; and secondarily curing the remaining portion of the UV resin by performing secondary UV irradiation on the remaining portion of the UV resin.

Primarily curing the UV resin may include: placing a mask for UV exposure; and performing the primary UV irradiation.

The mask may include a light blocking layer on at least one surface of the mask, the light blocking layer defining an area less than an area of the window base.

The carrier film may include a base layer and a liner layer on the base film, the liner layer defining an area for accommodating the window base.

The carrier film may further include an adhesive layer disposed between the base film and the liner layer.

The area defined by the light blocking layer may be less than the area defined by the liner layer of the carrier film.

The carrier film may include a base layer and a liner layer on the base film, the liner layer defining an area for accommodating the window base.

The carrier film may further include an adhesive layer disposed between the base film and the liner layer.

The carrier film may include a light blocking layer disposed on another surface of the carrier film, and an area of the window base may be larger than the area defined by the light blocking layer.

The area defined by the light blocking layer may be less than the area defined by the liner layer.

At least a portion of the light blocking layer may overlap an end portion of the window base by a range of overlap from about 0.1 mm to about 0.5 mm.

The range of overlap between the light blocking layer and the window base may be determined in proportion to an amount of UV irradiation.

The amount of UV irradiation may be in a range from about 120 mJ to about 170 mJ.

Forming the assembly by attaching the carrier film to the window base may include attaching the window base to the area defined by the liner layer of the carrier film.

The method may further include separating the primarily cured UV resin and the assembly from the jig to dispose the primarily cured UV resin and the assembly so that the UV resin faces upwards.

The jig may be one of a glass substrate and a polycarbonate substrate.

Removing the uncured portion of the UV resin may include removing the uncured portion of the UV resin with an organic solvent selected from the group consisting of methyl alcohol, ethyl alcohol, isopropyl alcohol, and butyl alcohol.

According to an embodiment of the present disclosure, a carrier film used in manufacturing a window glass includes: a base film; and a liner layer disposed on one surface of the base film, the liner layer defining an area for accommodating the window base.

The base film may include at least one of polyethylene terephthalate (PET), polycarbonate (PC) and stretched polypropylene (OPP).

The carrier film may further include a light blocking layer disposed on another surface of the base film.

The carrier film may further include an adhesive layer disposed between the base film and the liner layer.

The adhesive layer may include at least one selected from the group consisting of a rubber-based adhesive, an acryl-based adhesive, a vinyl ester-based adhesive, a silicon-based adhesive and a urethane-based adhesive.

An area of the window base may be larger than an area defined by the light blocking layer.

The area defined by the light blocking layer may be less than the area defined by the liner layer.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the present disclosure will become more apparent by describing in detail embodiments thereof with reference to the accompanying drawings, wherein:

FIG. 9 is a cross-sectional view illustrating an assembly formed by attaching the carrier film to a window base according to a second embodiment of the present disclosure;

FIG. 10 is a cross-sectional view illustrating a process of coating a resin over an upper surface of a jig and then attaching the UV resin on the jig and the assembly to each other by using a roller, according to a second embodiment of the present disclosure;

FIG. 11 is a cross-sectional view illustrating a process of disposing the window base attached with the carrier film on the jig and then performing primary UV irradiation, according to a second embodiment of the present disclosure;

DETAILED DESCRIPTION

Figure 1:
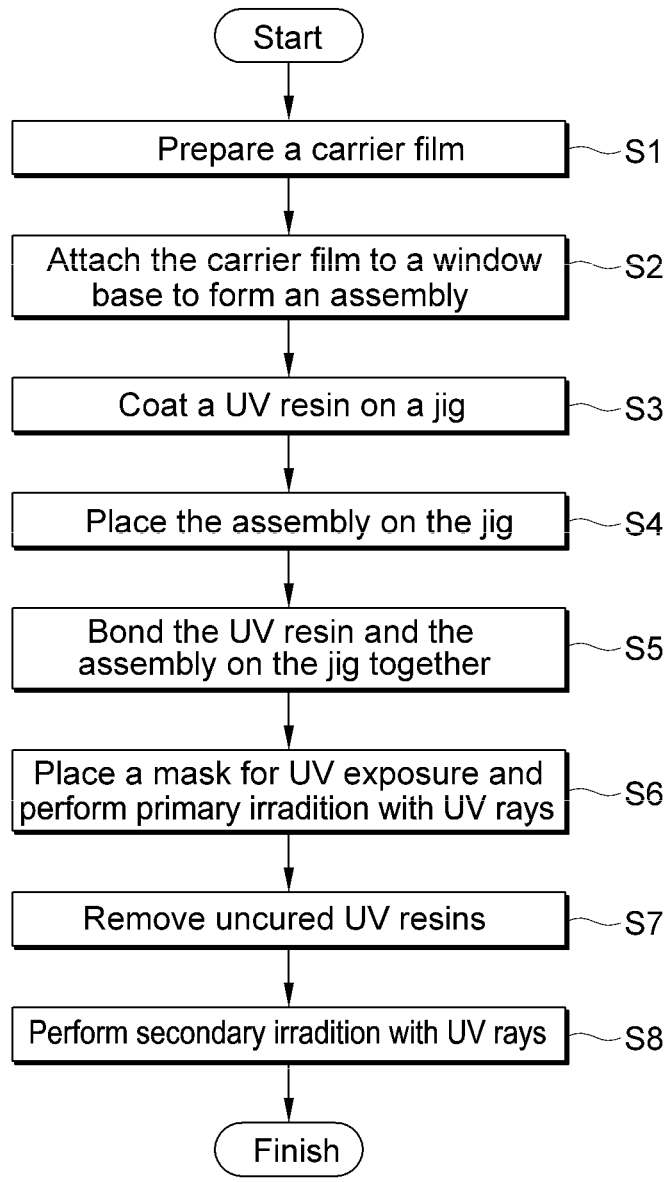
FIG. 1 is a flowchart showing a method for manufacturing a window glass according to a first embodiment of the present disclosure.

Embodiments will now be described more fully hereinafter with reference to the accompanying drawings. Although the present disclosure may be modified in various manners and have several embodiments, embodiments are illustrated in the accompanying drawings and will be mainly described in the specification. However, the scope of the present disclosure is not limited to the embodiments and should be construed as including all the changes, equivalents, and substitutions included in the spirit and scope of the present disclosure.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "lower", "above", "upper", or the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," or the like may be used herein to describe various elements, these elements should not be limited by these terms. These terms are only used to distinguish one element from another element. Thus, "a first element" discussed below could be termed "a second element" or "a third element," and "a second element" and "a third element" may be termed likewise without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe embodiments of the present disclosure, and like reference numerals refer to like elements throughout the specification.

Hereinafter, a method for manufacturing a window glass according to a first embodiment of the present disclosure will be described with reference to FIGS. 1 to 6. FIG. 1 is a flowchart showing a method for manufacturing a window glass according to a first embodiment of the present disclosure, and FIGS. 2 to 6 are cross-sectional views illustrating processes according to the flowchart shown in FIG. 1.

Figure 2:
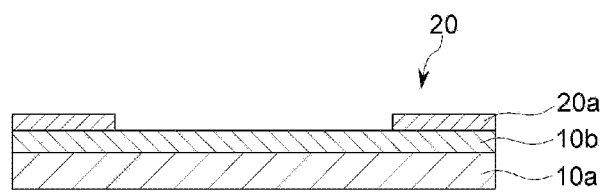
FIG. 2 is a cross-sectional view illustrating a carrier film according to a first embodiment of the present disclosure.
Figure 3:
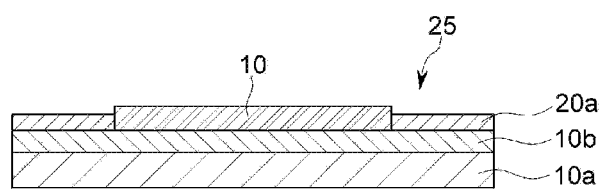
FIG. 3 is a cross-sectional view illustrating an assembly formed by attaching the carrier film to a window base according to a first embodiment of the present disclosure.
Figure 4:
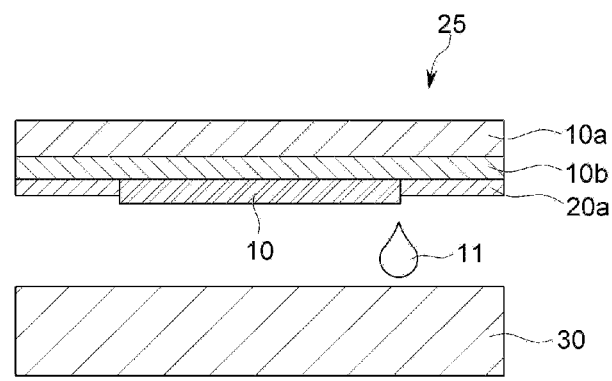
FIG. 4 is a cross-sectional view illustrating a process of coating a resin over an upper surface of a jig and then disposing the window base attached with the carrier film on the jig, according to a first embodiment of the present disclosure.
Figure 5:
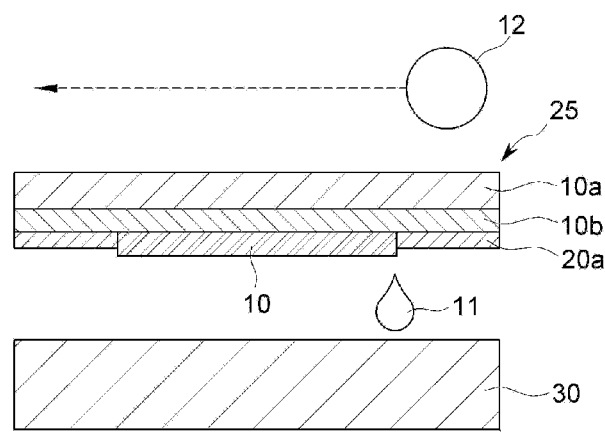
FIG. 5 is a cross-sectional view illustrating a process of attaching the UV resin on the jig and the assembly to each other by using a roller.
Figure 6:
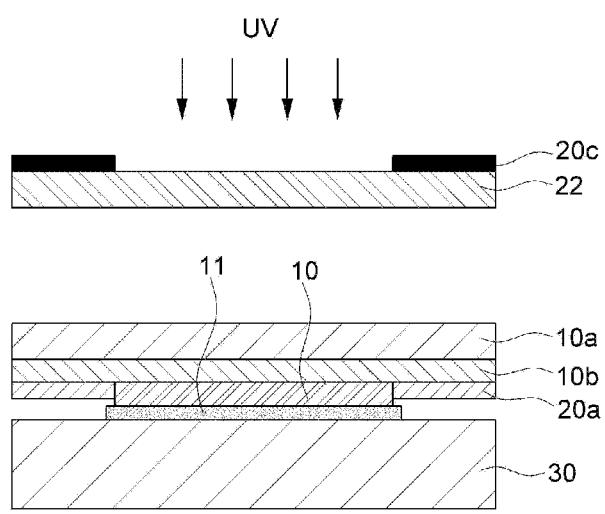
FIG. 6 is a cross-sectional view illustrating a process of disposing the window base attached with the carrier film on the jig and then performing primary UV irradiation, according to a first embodiment of the present disclosure.

FIG. 2 is a cross-sectional view illustrating a carrier film according to a first embodiment of the present disclosure, FIG. 3 is a cross-sectional view illustrating an assembly formed by attaching a carrier film to a window base according to a first embodiment of the present disclosure, FIG. 4 is a cross-sectional view illustrating a process of coating a resin over an upper surface of a jig and then disposing the window base attached with the carrier film on the jig, according to a first embodiment of the present disclosure, FIG. 5 is a cross-sectional view illustrating a process of attaching the UV resin on the jig and the assembly to each other by using a roller, and FIG. 6 is a cross-sectional view illustrating a process of disposing the window base attached with the carrier film on the jig and then performing primary UV irradiation, according to a first embodiment of the present disclosure.

A method for manufacturing a window glass according to a first embodiment of the present disclosure includes preparing a carrier film 20 (step S1); forming an assembly 25 by attaching the carrier film 20 to a window base 10 (step S2); coating a UV resin 11 on a jig 30 (step S3); placing the assembly 25 on the jig 30 so that the window base 10 faces downwards (step S4); attaching the assembly 25 to the UV resin 11 on the jig 30 by using a roller 12 (step S5); primarily curing the UV resin 11 by performing primary UV irradiation to an upper portion of the assembly 25 attached with the UV resin 11 on the jig 30 (step S6); removing an uncured portion of the UV resin 11 (step S7); and secondarily curing a remaining portion of the UV resin 11 by performing secondary UV irradiation to the remaining portion of the UV resin 11 from which the uncured portion of the UV resin 11 has been removed (step S8).

The carrier film 20 according to a first embodiment of the present disclosure includes a base film 10a and a liner layer 20a. The liner layer 20a is disposed on one surface of the base film 10a and defines an area for accommodating the window base 10.

FIG. 1 is a flowchart showing a method for manufacturing a window glass according to a first embodiment of the present disclosure, and FIGS. 2 to 6 are cross-sectional views illustrating the state of the product in each process shown in the flowchart in FIG. 1. Accordingly, FIGS. 2 to 6 will be described with reference to the flowchart.

First, as illustrated in FIG. 2, the carrier film 20 is prepared (step S1). In such an embodiment, the carrier film 20 includes a base film 10a and a liner layer 20a.

The base film 10a includes an optically transparent thermoplastic resin or a composition including the optically transparent thermoplastic resin, e.g., at least one of polyethylene terephthalate (PET), polycarbonate (PC) and stretched polypropylene (OPP). In such an embodiment, the thickness of the base film 10a is not particularly limited, but may be 250 μm or about 250 μm.

The liner layer 20a is disposed on one surface of the base film 10a to define an area for accommodating the window base 10. The liner layer 20a may be formed including a composition the same as or substantially the same as that included in the base film 10a. The thickness of the liner layer 20a may be less than the thickness of the base film 10a, and may be 15 μm to about 15 μm.

In addition, the carrier film 20 further includes an adhesive layer 10b disposed between the base film 10a and the liner layer 20a. The adhesive layer 10b may include at least one selected from the group consisting of a rubber-based adhesive, an acryl-based adhesive, a vinyl ester-based adhesive, a silicon-based adhesive, and a urethane-based adhesive.

Referring to FIG. 3, the window base 10 is attached to the area defined by the liner layer 20a of the carrier film 20 to form the assembly 25 (step 2).

Referring to FIG. 4, the UV resin 11 is coated on the jig 30 (step S3), and the assembly 25 including the window base 10 to which the carrier film 20 is attached is disposed on the jig 30 so that the window base 10 faces downwards (step S4). The jig 30 may be either a glass substrate or a polycarbonate substrate. According to an embodiment of the present disclosure, since the jig 30 is attached to the UV resin 11, it is preferable that the jig 30 be a glass substrate that may maintain surface quality when attached to the UV resin 11, rather than a polycarbonate substrate that includes a polymer resin.

Referring to FIG. 5, the assembly 25 and the UV resin 11 on the jig 30 are attached to each other using the roller 12 (step S). The window base 10, to which the carrier film 20 is assembled, may be attached to the jig 30, on which the resin is coated, by a single pressing process using the roller 12, such that the window surface may be uniformly coated.

Referring to FIG. 6, an upper portion of the assembly 25, attached with the UV resin 11 on the jig 30, is primarily irradiated with UV light to primarily cure the UV resin 11 (step S6). A mask 22 is placed on an upper surface of the assembly 25 for UV irradiation. The UV resin 11 is exposed to the primary UV irradiation. In such an embodiment, the mask 22 includes, on at least one surface of the mask 22, a light blocking layer 20c that defines an area less than an area of the window base 10.

In an embodiment, when the upper portion of the assembly 25 attached with the UV resin 11 on the jig 30 is primarily irradiated with UV light in step S6, the UV resin 11 located below the mask 22 is cured, except a portion of the UV resin 11 that corresponds to and is blocked by the light blocking layer 22c of the mask 22. The area of the cured portion of the UV resin 11 is less than the area of the window base 10 due to the light blocking layer 22c, and thus the primarily cured UV resin 11 is substantially prevented from flowing over the area of the window base 10. In addition, the cured portion of the UV resin 11 is attached to the uncured portion of the UV resin 11. Thereafter, the pattern defined by the mask 22 may be further firmly formed on the window base 10 through step S7 in which the uncured portion of the UV resin 11 is removed and by step S8 in which the remaining portion of the UV resin from which the uncured portion of the UV resin is removed is secondarily cured by secondary UV irradiation. Through such processes, the window base 10 having the pattern defined by the mask 22 may be mass-produced.

However, as illustrated in FIG. 6, the UV molding process is required several times in the process of manufacturing a window glass for a large-sized display device using the mask 22, and thus the lifetime of the mask 22 may be reduced and the number masks 22 required over time may increase. Accordingly, the manufacturing costs of the window glass may greatly increase.

Hereinafter, a method for manufacturing a window glass according to a second embodiment of the present disclosure in which the mask is not used, and a carrier film used in the method for manufacturing a window glass will be described in detail. FIGS. 8 to 14 are cross-sectional views illustrating processes according to the flowchart shown in FIG. 7.

Figure 8:
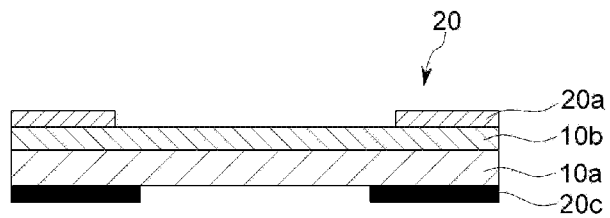
FIG. 8 is a cross-sectional view illustrating a carrier film according to a second embodiment of the present disclosure.
Figure 12:
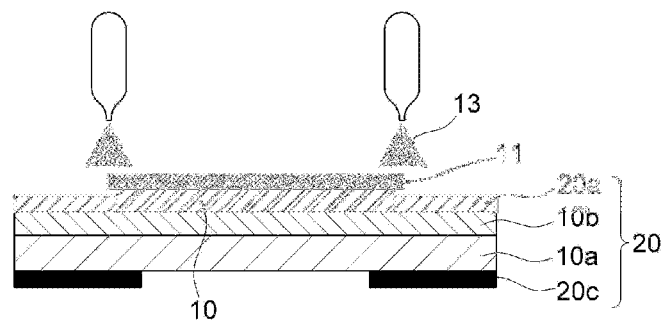
FIG. 12 is a cross-sectional view illustrating a process of removing an uncured portion of the UV resin according to a second embodiment of the present disclosure.
Figure 13:
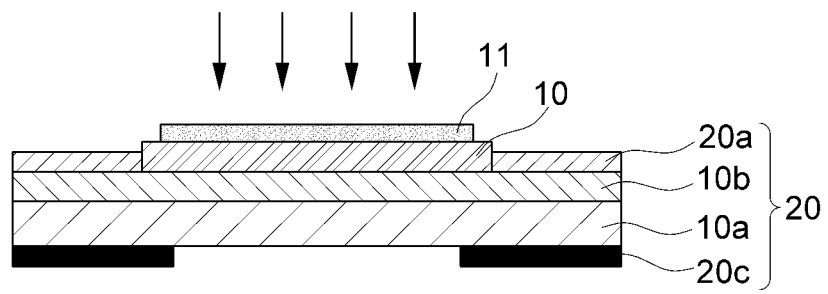
FIG. 13 is a cross-sectional view illustrating secondary UV irradiation according to a second embodiment of the present disclosure.

FIG. 8 is a cross-sectional view illustrating a carrier film according to a second embodiment of the present disclosure, FIG. 9 is a cross-sectional view illustrating an assembly formed by attaching the carrier film to a window base according to a second embodiment of the present disclosure, FIG. 10 is a cross-sectional view illustrating a process of coating a resin over an upper surface of a jig and then attaching the UV resin on the jig and the assembly to each other by using a roller, according to a second embodiment of the present disclosure, FIG. 11 is a cross-sectional view illustrating a process of disposing the window base attached with the carrier film on the jig and then performing primary UV irradiation, according to a second embodiment of the present disclosure, FIG. 12 is a cross-sectional view illustrating a process of removing an uncured portion of the UV resin according to a second embodiment of the present disclosure, and FIG. 13 is a cross-sectional view illustrating secondary UV irradiation according to a second embodiment of the present disclosure.

A method for manufacturing a window glass according to a second embodiment of the present disclosure includes preparing a carrier film 20 (step S71), forming an assembly 25 by attaching the carrier film 20 to a window base 10 (step S72), coating a UV resin 11 on a jig 30 (step S73), placing the assembly 25 on the jig 30 so that the window base 10 faces downwards (step S74), attaching the assembly 25 to the UV resin 11 on the jig 30 by using a roller 12 (step S75), primarily curing the UV resin 11 by performing primary UV irradiation to an upper portion of the assembly 25 attached with the UV resin 11 on the jig 30 (step S76), removing an uncured portion of the UV resin 11 (step S77), and secondarily curing a remaining portion of the UV resin 11 from which the uncured portion of the UV resin 11 has been removed by performing secondary UV irradiation (step S78).

The method for manufacturing a window glass according to a second embodiment of the present disclosure differs from the above-described method for manufacturing a window glass according to a first embodiment of the present disclosure as below.

First, the carrier film 20 according to a second embodiment of the present disclosure includes a light blocking layer 20c that serves as a UV mold on the carrier film itself.

Figure 7:
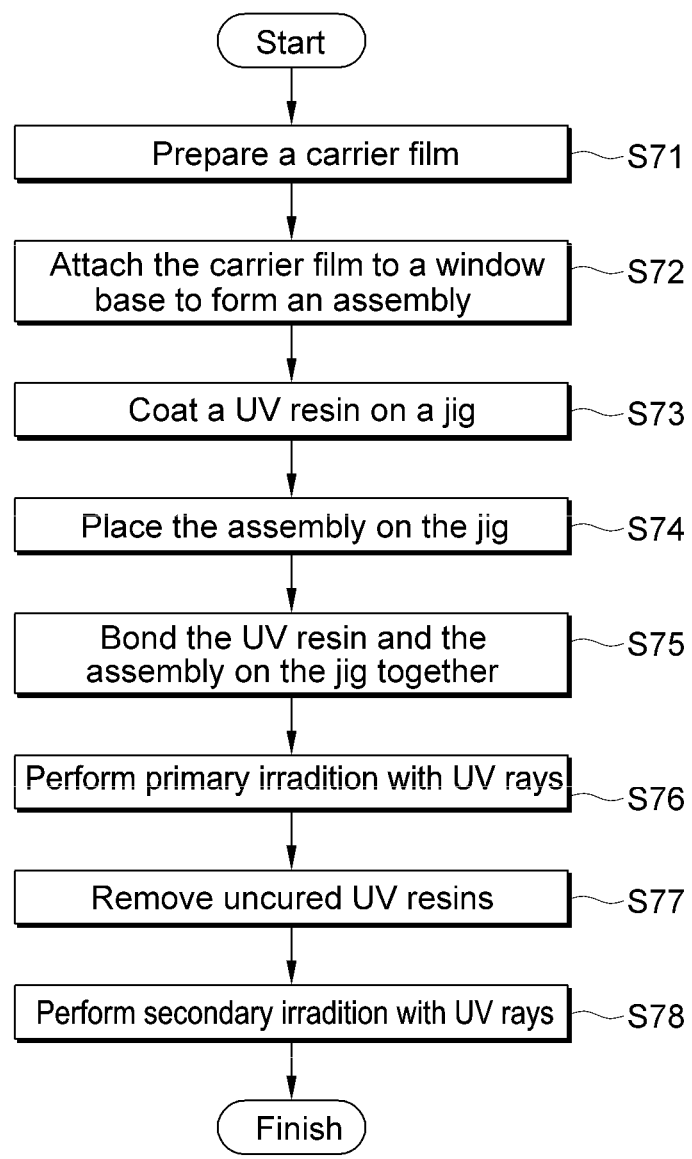
FIG. 7 is a flowchart showing a method for manufacturing a window glass according to a second embodiment of the present disclosure.

Second, according to a second embodiment of the present disclosure, dissimilar to a first embodiment of the present disclosure in which the mask 22 for UV exposure is placed in the primary UV irradiation, the primary UV irradiation is performed without separate molding, which will be described with reference to FIGS. 8 to 16 according to the flowchart in FIG. 7.

First, as illustrated in FIG. 8, the carrier film 20 is prepared (step S71). In such an embodiment, the carrier film 20 includes a base film 10a and a liner layer 20a.

The base film 10a includes an optically transparent thermoplastic resin or a composition including the optically transparent thermoplastic resin, e.g., at least one selected from polyethylene terephthalate (PET), polycarbonate (PC) and stretched polypropylene (OPP). The thickness of the base film 10a is not particularly limited, but may be 250 μm or about 250 μm.

The liner layer 20a is disposed on one surface of the base film 10a to define an area for accommodating the window base 10. In such an embodiment, the liner layer 20a is formed including a composition substantially the same as that included in the base film 10a. The thickness of the liner layer 20a may be less than the thickness of the base film 10a, and may be 15 μm or about 15 μm.

In addition, the carrier film 20 further includes an adhesive layer 10b disposed between the base film 10a and the liner layer 20a. In such an embodiment, the adhesive layer 10b includes at least one selected from the group consisting of a rubber-based adhesive, an acryl-based adhesive, a vinyl ester-based adhesive, a silicon-based adhesive, and a urethane-based adhesive.

Dissimilar to the carrier film 20 according to a first embodiment of the present disclosure, the carrier film 20 according to a second embodiment of the present disclosure includes the light blocking layer 20c disposed on another surface of the carrier film 20. In addition, referring to FIG. 15, it is preferable that an area 16 (see FIG. 15) defined by the light blocking layer 20c be designed to be less than an area 17 (see FIG. 15) to which the window base 10 is attached, i.e., an area defined by the liner layer 20a of the carrier film 20.

That is, according to a second embodiment of the present disclosure, the area of the window base 10 is larger than the area defined by the light blocking layer 20c that is formed at the carrier film itself, and the area defined by the light blocking layer 20c is less than the area defined by the liner layer 20a, which will be described in detail with reference to FIGS. 15 and 16.

Referring to FIG. 9, the assembly 25 is formed by attaching the window base 10 to the area that is defined by the liner layer 20a of the carrier film 20 to accommodate the window base 10 (step S72).

Referring to FIG. 10, the UV resin 11 is coated on the jig 30 (step S73). In such an embodiment, it is preferable that the UV resin be a UV curable resin. That is, it is preferable that the UV resin be a resin that may be cured by UV irradiation. For example, a UV resin based on urethane and/or acryl may be used. At least two different UV curable resins may be mixed to be used as the UV resin. For example, the UV resin may include a urethane acrylate oligomer and an acrylate monomer. Accordingly, the resins of different structures may be cured with a slight difference by UV irradiation. That is, by mixing different materials, the adhesive force may be further increased through curing. The UV resin may include an initiator to initiate polymerization reaction of the UV curable resin.

Thereafter, the assembly 25 which is the window base 10 to which the carrier film 20 is attached is disposed on the jig 30 so that the window base 10 faces downwards (step S74), and the assembly 25 and the UV resin 11 on the jig 30 are attached to each other using the roller 12 (step 75). The window base 10, to which the carrier film 20 is assembled, is attached to the jig 30, on which the resin is coated, by a single pressing process using the roller 12, such that the window surface may be uniformly coated.

The jig 30 may be a glass substrate and/or a polycarbonate substrate. According to an embodiment of the present disclosure, since the jig 30 is attached to the UV resin 11, it is preferable that the jig 30 be a glass substrate that may maintain the surface quality when attached to the UV resin 11, rather than a polycarbonate substrate that includes a polymer resin.

Referring to FIG. 11, an upper portion of the assembly 25 attached with the UV resin 11 on the jig 30 is primarily irradiated with UV light to primarily cure the UV resin 11 (step S76). In such an embodiment, dissimilar to the carrier film 20 according to a first embodiment of the present disclosure, the carrier film 20 according to a second embodiment of the present disclosure itself includes the light blocking layer 20c that serves as a UV mold, and thus the process of placing the mask for UV irradiation is omitted.

When the upper portion of the assembly 25 attached with the UV resin 11 on the jig 30 is primarily irradiated with UV light in step S76, the UV resin 11 located below the assembly 25 is cured, except for a portion of the UV resin 11 that corresponds to the light blocking layer 20c. In such an embodiment, the area of the cured portion of the UV resin 11 is less than the area of the window base 10 due to the light blocking layer 20c, and thus the primarily cured UV resin 11 is substantially prevented from flowing over the area of the window base 10. In addition, the cured portion of the UV resin 11 is attached to the UV resin 11.

Next, referring to FIG. 12, the primarily cured UV resin 11 and the assembly 25 are separated from the jig 30, and are disposed so that the UV resin 11 faces upwards. A developer 13 including an organic solvent selected from the group consisting of methyl alcohol, ethyl alcohol, isopropyl alcohol, and butyl alcohol is sprayed on the UV resin 11 to remove a portion of the UV resin 11 that is uncured in the primary UV irradiation (step 77). Accordingly, the UV resin 11 that may flow over the area of the window base 10 in the process of manufacturing a window glass is completely removed.

Figure 14:
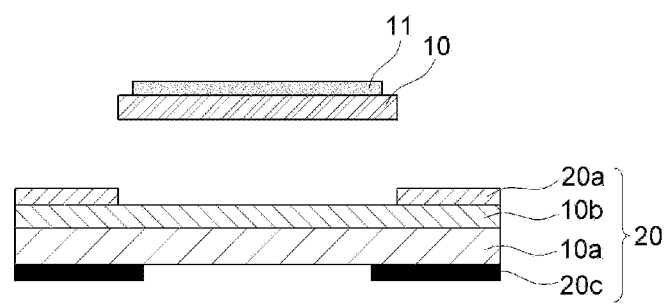
FIG. 14 is a cross-sectional view illustrating a process of separating the completed window glass according to a second embodiment of the present disclosure from the carrier film.

Referring to FIG. 13, a remaining portion of the UV resin 11 from which the uncured portion of the UV resin 11 is removed is secondarily cured by secondary UV irradiation (step S78). Since the UV resin 11 is post-cured, the UV resin 11 maintains a state more firmly attached to the window base 10. Thereafter, as illustrated in FIG. 14, the window base 10, on an upper surface of which the UV resin 11 is formed, is separated from the carrier film 20, and thus the window glass may be mass-produced.

Figure 15:
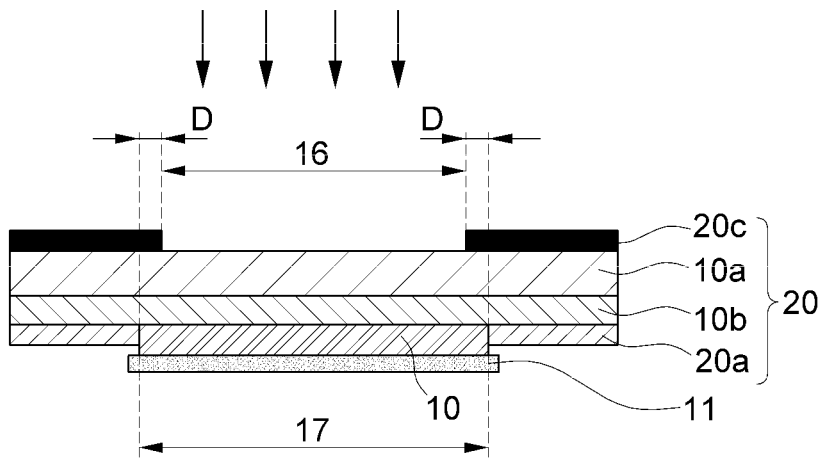
FIG. 15 is a view for explaining the structure of the carrier film according to a second embodiment of the present disclosure.
Figure 16:
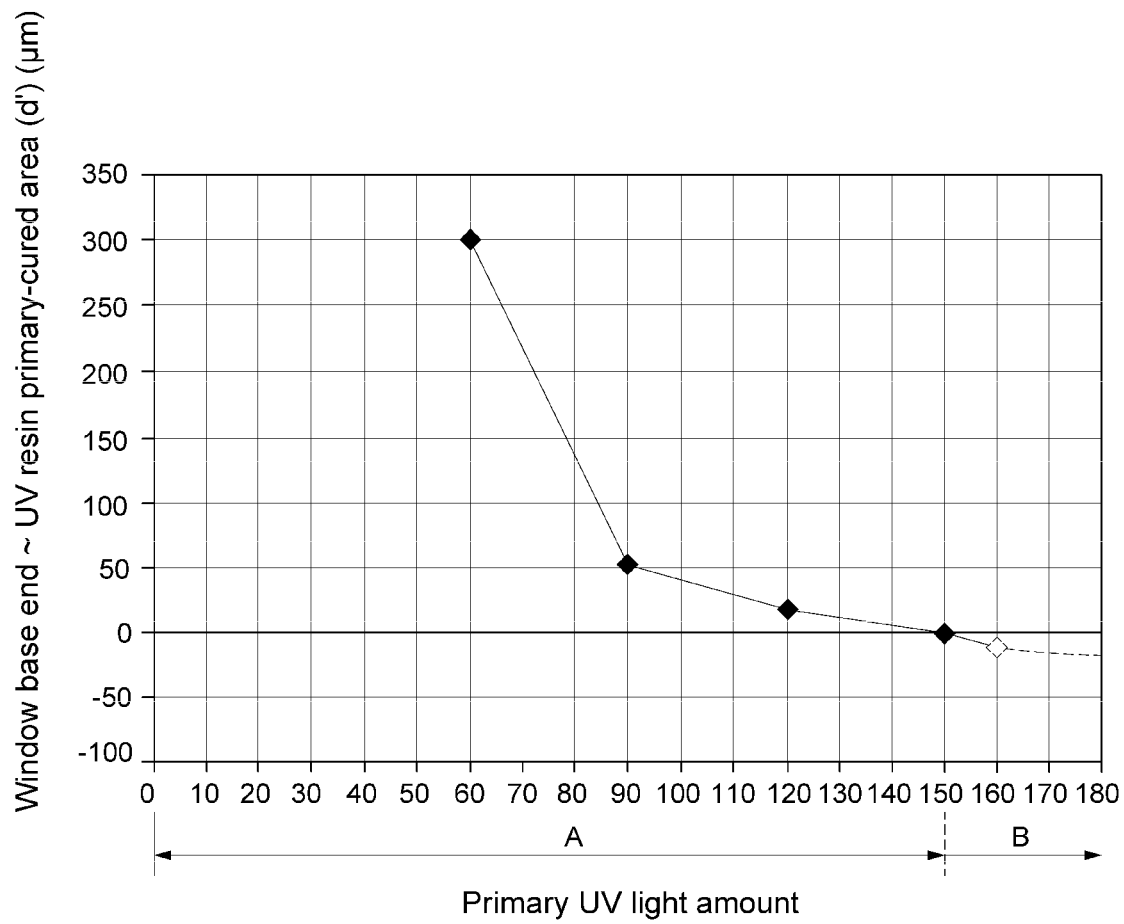
FIG. 16 is a graph for explaining the relationship between the distance from an end portion of the window base to a primarily cured area of the UV resin and the amount of UV light according to a second embodiment of the present disclosure.

FIG. 15 is a view for explaining the structure of the carrier film according to a second embodiment of the present disclosure, and FIG. 16 is a graph for explaining the relationship between the distance from an end portion of the window base 10 to a primarily cured area of the UV resin 11 and the amount of UV light according to a second embodiment of the present disclosure.

Referring to FIG. 15, the carrier film 20 includes the base film 10a, the liner layer 20a, the adhesive layer 10b, and the light blocking layer 20c. The liner layer 20a is disposed on one surface of the base film 10a and defines the area for accommodating the window base 10 (see FIG. 9), the adhesive layer 10b is disposed between the base film 10a and the liner layer 20a, and the light blocking layer 20c is disposed on another surface of the base film 10a.

As described hereinabove with reference to FIG. 11, when the UV resin 11 is primarily irradiated with UV light to be primarily cured, in the case that an end portion of the window base 10 and an end portion of the light blocking layer 20c are aligned with each other in the vertical direction, the pre-cured UV resin 11 may flow over the area of the window base 10 below the window base 10 due to UV light scattering by the UV irradiation, which may lead to a defective window base. Accordingly, it is preferable that the area 17 of the window base 10, i.e., the area defined by the liner layer 20a of the carrier film 20, be designed to be larger than the area 16 defined by the light blocking layer 20c that is formed at the carrier film 20 itself.

Referring to FIG. 15, when the area 17 of the window base 10 is designed to be larger than the area 16 defined by the light blocking layer 20c, at least a part of the light blocking layer 20c overlaps the end portion of the window base 10 by an offset distance D. That is, the offset distance D corresponds to the range of overlap between the window base 10 and the light blocking layer 20c. In other words, the offset distance D corresponds to the range of overlap in which at least a part of the light blocking layer 20c overlaps the end portion of the window base 10. The offset distance D may be determined in proportion to the amount of UV light (mJ). The offset distance (D) ranges from about 0.1 mm to about 0.5 mm, and in such an embodiment, the amount of UV light ranges from about 120 mJ to about 170 mJ.

Referring to FIG. 16, the abscissa indicates the amount (mJ) of primary UV irradiation according to a second embodiment of the present disclosure, and the ordinate indicates the distance (d') from the end portion of the window base 10 to the primarily cured area of the UV resin 11.

As illustrated in FIG. 16, when the distance d' from the end portion of the window base 10 to the primarily cured area of the UV resin 11 has a positive value (area A), since the UV resin 11 that is pre-cured in the primary UV irradiation below the window base 10 has an area slightly less than the area of the window base 10, the UV resin 11 may not be cured beyond the area of the window base 10.

However, when the amount of UV irradiation is substantially equal to or less than about 120 mJ, the UV resin 11 may not be sufficiently coated over the window base 10.

On the other hand, when the amount of UV light is substantially equal to or more than about 150 mJ (area B), the distance d' from the end portion of the window base 10 to the primarily cured area of the UV resin 11 has a negative value. Since the UV resin 11 that is pre-cured in the primary UV irradiation below the window base 10 may have an area larger than the area of the window base 10, the UV resin 11 is cured in an unnecessary area.

As such, according to an embodiment of the present disclosure, the UV resin 11 may be coated to the area substantially equal to the area of the window base 10 in the primary UV irradiation by designing the area 17 of the window base 10 to be larger than the area 16 defined by the light blocking layer 20c formed at the carrier film 20 itself or by adjusting the amount of UV light (mJ) in the primary UV irradiation to be in the range from about 120 mJ to about 170 mJ.

As set forth hereinabove, a method for manufacturing a window glass according to one or more embodiments of the present disclosure and a carrier film used in the method for manufacturing a window glass may provide the following effects.

According to one or more embodiments of the present disclosure, a light blocking layer that functions as a UV mold is formed at a carrier film itself, and thus the UV molding process for masking may be omitted from the process of manufacturing a window glass. Accordingly, the process of manufacturing a window glass may be simplified, and the manufacturing costs may be reduced.

In addition, according to one or more embodiments of the present disclosure, the window surface may be uniformly coated by attaching a glass substrate coated with a resin and a window base assembled with a carrier film by using a roller, and thus the original surface quality of the glass may be maintained.

In addition, according to one or more embodiments of the present disclosure, the area defined by a light blocking layer of a carrier film is designed to be less than the area defined by a liner layer, and the area of a window base is designed to be larger than the area defined by the light blocking layer, and thus the phenomenon in which a UV resin which has been pre-cured during primary UV irradiation flows over the area of the window base may be substantially prevented. Accordingly, defects due to overflow of the UV resin that may occur in the process of manufacturing a window glass may be substantially prevented.

While the present disclosure has been illustrated and described with reference to the embodiments thereof, it will be apparent to those of ordinary skill in the art that various changes in form and detail may be made thereto without departing from the spirit and scope of the present disclosure.

What is claimed is:

1. A method for manufacturing a window glass, the method comprising:
preparing a carrier film;
attaching the carrier film to a window base to form an assembly;
coating a resin on a jig;
placing the assembly on the jig so that the window base faces downwards;
attaching the assembly and the resin on the jig to each other;
placing a mask for exposure, the mask comprising a light blocking layer on at least one surface of the mask, the light blocking layer overlapping an end portion of the window base and configured to prevent the resin on the edge of the window base from being cured, wherein an opening disposed inside of the window base in a plan view is defined in the light blocking layer;
primarily curing a portion of the resin overlapping the opening by performing primary irradiation to an upper portion of the assembly attached with the resin on the jig;
removing an uncured portion of the resin overlapping the light blocking layer; and
secondarily curing a remaining portion of the resin from which the uncured portion of the resin has been removed by performing secondary irradiation on the remaining portion of the resin.

2. The method of claim 1, wherein the opening of the light blocking layer has an area less than an area of the window base.

3. The method of claim 2, wherein the carrier film comprises a base layer and a liner layer on the base film, the liner layer defining an area for accommodating the window base, and wherein a thickness of the liner layer is less than a thickness of the base film.

4. The method of claim 1, wherein the carrier film further comprises an adhesive layer disposed between the base film and the liner layer.

5. The method of claim 4, wherein the area of the opening of the light blocking layer is less than the area defined by the liner layer of the carrier film.

6. The method of claim 1, wherein the carrier film comprises a base layer and a liner layer on the base film, the liner layer defining an area for accommodating the window base.

7. The method of claim 6, wherein the carrier film further comprises an adhesive layer disposed between the base film and the liner layer.

8. A method for manufacturing a window glass, the method comprising:
preparing a carrier film;
attaching a window base to one surface of the carrier film to form an assembly, the carrier film comprising a light blocking layer disposed on opposite surface of the carrier film, the light blocking layer overlapping an end portion of the window base and configured to prevent the resin on the edge of the window base from being cured, wherein an opening disposed inside of the window base in a plan view is defined in the light blocking layer;
coating a resin on a jig;
placing the assembly on the jig so that the window base faces downwards;
attaching the assembly and the resin on the jig to each other;
primarily curing a portion of the resin overlapping the opening by performing primary irradiation to an upper portion of the assembly attached with the resin on the jig;
removing an uncured portion of the resin overlapping the light blocking layer; and
secondarily curing a remaining portion of the resin from which the uncured portion of the resin has been removed by performing secondary irradiation on the remaining portion of the resin.

9. The method of claim 8, wherein the opening of the light blocking layer has an area less than the area defined by the liner layer.

10. The method of claim 9, wherein at least a portion of the light blocking layer overlaps the end portion of the window base by a range of overlap from 0.1 mm to 0.5 mm.

11. The method of claim 10, wherein the range of overlap between the light blocking layer and the window base is determined in proportion to an amount of irradiation.

12. The method of claim 11, wherein the amount of irradiation is in a range from about 120 mJ to about 170 mJ.

13. The method of claim 8, wherein forming the assembly by attaching the carrier film to the window base comprises:
attaching the window base to the area defined by the liner layer of the carrier film.

14. The method of claim 13, further comprising separating the primarily cured resin and the assembly from the jig to dispose the primarily cured resin and the assembly so that the resin faces upwards.

15. The method of claim 14, wherein the jig is one of a glass substrate and a polycarbonate substrate.

16. The method of claim 15, wherein removing the uncured portion of the resin comprises:
   removing the uncured portion of the resin with an organic solvent selected from the group consisting of methyl alcohol, ethyl alcohol, isopropyl alcohol, and butyl alcohol.

* * * * *